UNITED STATES PATENT OFFICE.

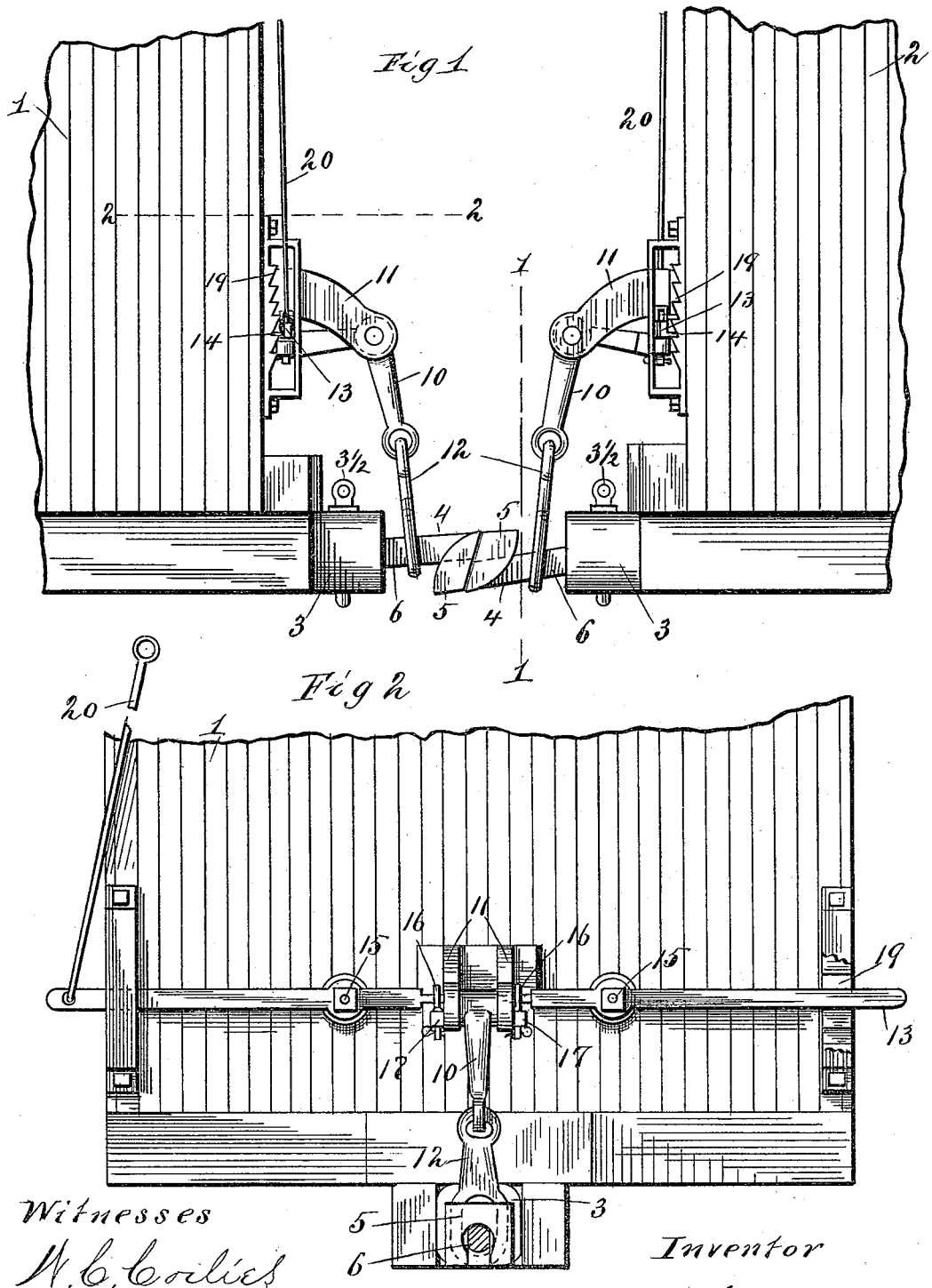

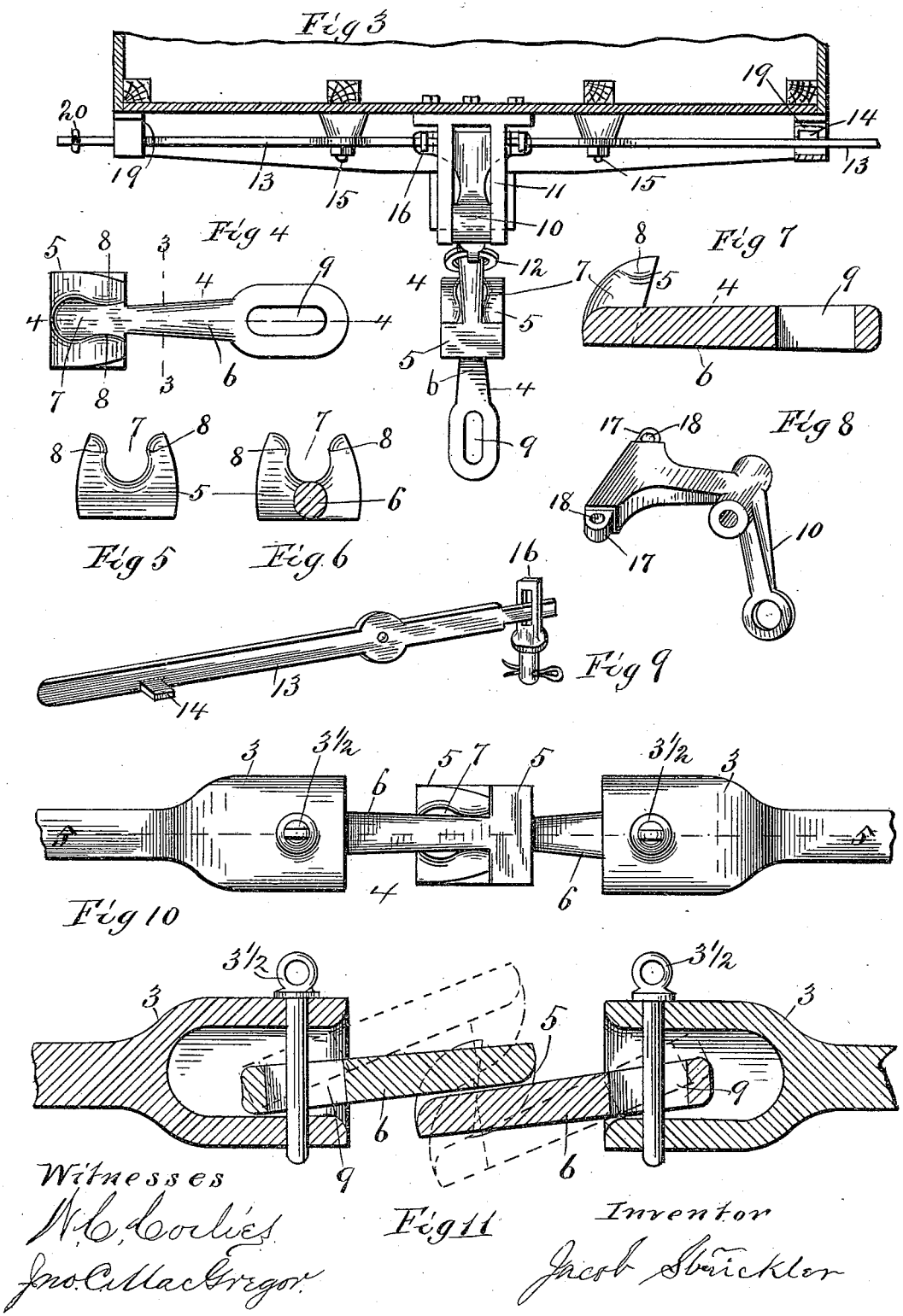

JACOB STRICKLER, OF CHICAGO, ILLINOIS.

CAR-COUPLING LINK.

SPECIFICATION forming part of Letters Patent No. 438,088, dated October 7, 1890.

Application filed January 3, 1890. Serial No. 335,825. (No model.)

*To all whom it may concern:*

Be it known that I, JACOB STRICKLER, of Chicago, in the county of Cook and State of Illinois, have invented a certain new and useful Improvement in Links for Coupling Railway-Cars, which is fully set forth in the following specification, reference being had to the accompanying drawings, in which—

Figure 1 represents the side elevation of the ends of two freight-cars; Fig. 2, a cross-section taken on the line 1 1, Fig. 1, showing apparatus for uncoupling the links; Fig. 3, a detail plan section taken on the line 2 2, Fig. 1; Fig. 4, a plan view of my improved link; Fig. 5, an end elevation of the same; Fig. 6, a cross-section of same, taken on the line 3 3, Fig. 4; Fig. 7, a longitudinal section of the same taken on the line 4 4, Fig. 4; Fig. 8, a perspective view of a bell-crank lever used to operate the lifting device; Fig. 9, a perspective view of one of the levers; Fig. 10, a plan view of the links and draw-bars in position detached from the cars; and Fig. 11, a longitudinal section taken on the line 5 5, Fig. 10.

The object of my invention is to produce a coupling-link for railway-cars or similar vehicles which will operate to couple such cars automatically, and which may be readily uncoupled without danger to either life or limb by avoiding any necessity of the operator going between the cars, all of which will be hereinafter more fully explained, and pointed out in the claims.

The operation of my link is not wholly unlike the ordinary oblong link now in use for the same purpose; but to obviate the necessity of going between the cars to fasten or unfasten the links by inserting or withdrawing the pin now used for that purpose I have constructed a link with a suitable slot at one end for insertion into the draw-head of a car, and which may be securely fastened therein by an ordinary coupling-pin such as is now in common use, but at the other end is shaped substantially as shown in Fig. 1, so that when cars are pushed together the exposed ends of the links coming in contact one is forced up and over the other and then drops into place, securely locking them together, as shown in Fig. 11.

These links are made tapering in the shank to allow free play when cars are in motion or turning a curve and to prevent becoming disengaged when the train slackens its speed.

I make these links preferably of wrought-iron; but they may be made of any suitable material.

The coupling-pin now in use is retained, and in the event of accident—such as breaking or loss of either of my links—the ordinary oblong link may readily be substituted therefor, as no change is made in the draw-bar now used.

As great danger from exposure of the person between the cars is sought to be avoided, I have devised an apparatus to be placed on the end of each car, as shown in Figs. 1 and 2, by which the operator may raise the link to the desired position by means of the arm or lever 13 or the rod 20, as shown in Fig. 2.

The raising of a link for the purpose of uncoupling is effected when on the ground by raising the lever 13 or when on top of the car by lifting rod 20, in either of which cases the outer end of said lever 13 is made to engage with ratchet-teeth suitably arranged for that purpose, as shown, and is firmly held in position until it is desired to again be coupled, when by outward pressure of the lever 13 it is instantly released, and the link again drops into place. The rod 20 may also be used to disengage the link 4 by lifting as before and then suddenly dropping it, when the lug 17 will pass the ratchet-teeth by reason of the weight, and is thus prevented from engaging with said teeth. A suitable guard is placed over the ratchet-teeth 19 and holds lever 13 in position at the edge of the car. This device for lifting the links consists of lever 13, suitably held in place at either end of the car by a box or guard, which latter also contains suitable ratchet-teeth for securely holding said levers 13 in the desired position. These levers 13 have each a fulcrum at a suitable distance from their inner ends, and said inner extremity of each lever is made to engage with the crank-lever 10, secured to the end of the car in the center thereof at a suitable distance above the draw-head to permit of easy reach, as shown in Figs. 1 and 2. This lever 13, with a lug for engagement with ratchet 19 at the outer end and the socket-pin 16 at its connection with said lever 13, is shown in perspective in Fig. 9. Attached to crank-lever 10 is a suitable arm having a link or ring 11 of sufficient length and diameter to surround the link 4, and by means of which the crank-lever 10 when raised by the lever 13 is made to lift the links from contact with each other, and thus uncouple the cars. This manner of uncoupling cars is particularly desirable and advantageous when making what is called a "running switch."

In the drawings, 1 and 2 represent the freight-cars.

3 is an ordinary draw-bar.

4 is my improved link, and 5 is the enlarged head on its outer end.

6 is the stem or shank of my link.

7 is the opening in the head 5 for the admission of the shank 6 of the link 4 when the two links are coupled.

8 are projections on the head-piece 5 to prevent the links from being separated by sudden or violent vibration or when turning a curve.

9 is the oval or elongated slot at the inner end of my link to accommodate coupling with any ordinary link-pin.

10 is the ordinary bell-crank lever having an arm with an eyelet at its lower end for the insertion of a ring for the purpose of holding up the link 4. The upper ends of this bell-crank lever 10 are provided with lugs 17, with openings 18 through the latter to admit the socket-pin 16, as shown in Fig. 9 of the drawings.

11 are brackets properly secured to the ends of freight-cars and which form general bearings for the bell-crank lever 10.

12 is a suitable ring, one end secured in the eyelet on the lower end of the bell-crank lever 10 and its other end surrounding the shank portion 6 of one of the links 4, as shown in Figs. 1, 2, and 3.

13 is an ordinary lever.

14 is a lug at one side near the outer end of the lever 13 for engaging the ratchet-teeth.

15 is the fulcrum-pin for the lever 13.

16 is the socket-pin having a slot in its upper end for receiving the inner end of the lever 13, and is secured in place by a suitable pin or bolt through its lower end, which latter is inserted in the opening 18 of the lugs 17 on the upper ends of the bell-crank lever 10.

19 represents ordinary ratchet-teeth secured to the ends of the cars, as above described.

20 is an ordinary link-bar attached to the outer ends of the lever 13 for operating the lifting device from above.

Having thus described my invention, what I claim as new, and desire to secure by Letters Patent, is—

1. The link 4, constructed and arranged substantially as shown and described, as and for the purpose specified.

2. The lever 13, with its fulcrum, socket-pin 16, lug 14, ratchet-teeth 19, bell-crank lever 10, with arm and ring, and brackets 11, all arranged substantially as shown, and for the purpose specified.

3. The link 4, in combination with the bell-crank lever 10, lever 13, rod 20, and socket-pin 16, substantially as described and shown, and for the purpose specified.

JACOB STRICKLER.

Witnesses:
JNO. C. MACGREGOR,
E. C. CRAWFORD.